(No Model.)
W. YOUNG.
PLASHED HEDGE.
No. 254,085. Patented Feb. 21, 1882.
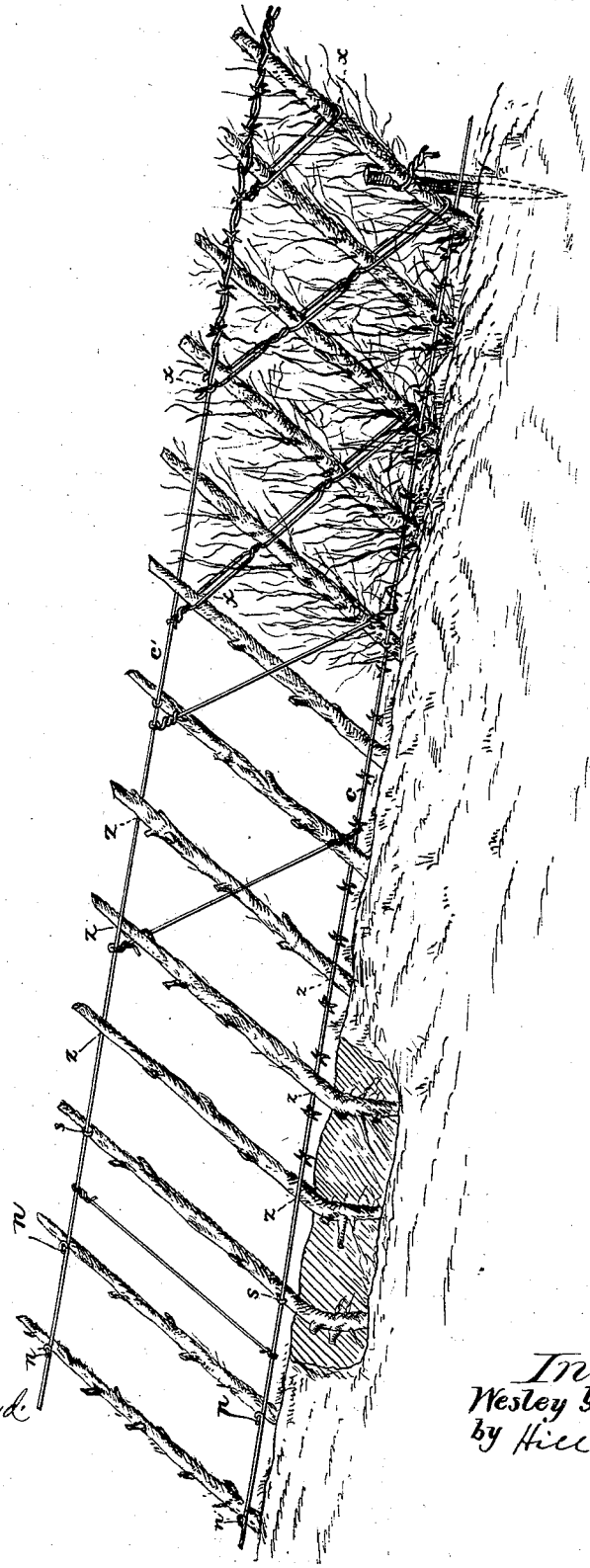
Witnesses.
Franck L. Ouraud
D. W. Norris
Inventor.
Wesley Young.
by Hill & Church
His Att'ys.

UNITED STATES PATENT OFFICE.

WESLEY YOUNG, OF DAYTON, OHIO.

PLASHED HEDGE.

SPECIFICATION forming part of Letters Patent No. 254,085, dated February 21, 1882.

Application filed December 16, 1881. (No model.)

*To all whom it may concern:*

Be it known that I, WESLEY YOUNG, of Dayton, in the county of Montgomery and State of Ohio, have invented certain new and useful Improvements in Plashed Hedges; and I do hereby declare the following to be a full, clear, and exact description of the same, reference being had to the accompanying drawing, forming a part of this specification, and in which the figure represents a perspective view of a hedge embodying my invention.

Since the invention of David M. Kirkbride, for which a patent was granted him May 30, 1876, special attention has been given to the growing of hedge fences, a vast amount of capital and labor have been expended in the development of the business, and a number of patents for marked improvements over pre-existing methods have been granted. The present invention looks to the still further development of this branch of industry, and has for its object to provide a hedge fence, which, from the time it is first plashed, will present a strong and impassable barrier to all ordinary stock which is usually permitted to run at large, and the proper growth of which hedge will not be interfered with by the causes ordinarily existing.

In the plashing of hedge fences, as at present practiced, the plants before plashing are usually first divested of their side branches, after which the plasher removes the soil from around the upper portion of the roots of the plants for some distance from the end of the row at which he intends to begin plashing. This being done, he preferably drives a stake in a proper position with reference to the first plant in the row, and bends down the plant, the bending taking place in the root of the plant, and secures it to the stake with wire or other fastening. He then takes a piece of wire and passes it under the base of the first plant quite near the ground, bringing its ends up on either side, and then bends down the next plant and crosses and twists the wire over it, and so on in like manner with each succeeding plant until he has secured as many plants as the wire is capable of holding in their proper relative positions, and when this is done he twists together the extremities of the wire. The wire runs approximately at right angles to the plants in their bent-down position. When the first section of wire is exhausted the plasher takes another and passes it around the base of the last or some preceding plant previously bent down, and then bends down and secures the succeeding plants as before, continuing in this manner with all the plants from the upper portion of the roots of which he has removed the soil, or one or more of the lines of wire may be stretched first, and then the plants bent down and secured in position by attaching them to the wire. When they are all bent down and secured he replaces the soil around the exposed parts of the roots, thus leaving the bodies of the plants above ground nearly straight and parallel to each other, though inclined in the plane of the fence.

When the fence is first plashed, and before the side shoots have sufficiently grown out and become interlocked, the fence has not that degree of lateral strength that is desirable. Moreover, it requires considerable time before there is a sufficient growth of the side shoots to fill up and protect the spaces between the plants, and meanwhile small pigs may pass through. As the pigs grow they root away the dirt so as to enlarge the openings to accommodate themselves, and the consequence is that the side shoots are injured by being constantly pushed aside and rubbed or broken off, and are not permitted to grow and close up the openings as they otherwise would.

In order to give the fence the requisite degree of lateral strength at the start, I apply a continuous horizontal line or lines of wire or other material along it from end to end, securing the said line or lines to the plants by staples *s s*, nails *n n*, loops *x x*, or other suitable fastenings, as shown in the drawing, or by interweaving it with the plants, as shown at *z z z*. I preferably apply two lines of wire, one, *c'*, near the upper ends of the plants after they are plashed and cut off to the proper height, and one, *c*, near their base, as represented in the drawing, though other intermediate lines of wire may also be employed, if thought necessary. I also prefer to employ barbed wire, as that affords additional effectiveness as a barrier to stock; but plain wire will answer reasonably well.

The upper line may consist of two wires twisted together and inclosing the upper ends of the plants, or it may consist of a single line, and may be secured as shown.

The lower wire is indispensable, for by its aid the openings between the plants are closed at the bottom from the start, and the small pigs are prevented from passing through, thereby enabling the side shoots of the plants to extend out and close the openings effectually, and making a firm, close fence as soon as the plashing is done. This lower wire should be placed quite near the surface of the ground to be most effective.

It will be seen that additional lateral strength of the fence is secured by the employment of the two lines of wire, one at the top and another at the bottom of the plants, with or without intermediate lines, and, secondly, that the effectual closing of the lower intervals of the fence to enable the shoots to properly develop is accomplished by the lower wire alone.

I am aware that it is not new to place a line of barbed wire along the bottom of a post-and-board fence for the purpose of preventing small animals from passing under the fence; also, that it is not new to interweave in the upper portion of a live-hedge fence withes or branches not a part of the growing fence, and such construction I do not claim as my invention. Neither do I claim a hedge fence in which the plants are plashed together by means of a continuous line of wire wound around them and from one to another near the upper ends, as shown in the patent of David M. Kirkbride, dated May 30, 1876; but What I do claim is—

1. A hedge fence composed of live plants bent down in the plane of the fence and held in place by suitable fastenings, and having a line of wire extending along the base of the plants near the ground, said wire being secured to the plants and operating to prevent the passage through the spaces between the plants of small stock before said spaces have become closed or protected by the growth of the shoots, substantially as described.

2. A hedge fence composed of live plants bent down in the plane of the fence and held in place by suitable fastenings, and having a horizontal line of wire extending along the upper portion of the plants, and secured thereto to give increased lateral strength, and having also a horizontal line of wire extending along and secured to the bases of the plants, for preventing the passage through the spaces between the plants of small stock before said spaces have become closed or protected by the growth of the side shoots, substantially as described.

WESLEY YOUNG.

Witnesses:
D. W. NORRIS,
W. J. DANE.